United States Patent

Rachfahl

(10) Patent No.: US 9,033,408 B2
(45) Date of Patent: May 19, 2015

(54) SAFETY SILL FOR A STRUCTURAL FRAME BEARING A BATTERY IN THE EVENT OF A SIDE IMPACT

(76) Inventor: Joachim Rachfahl, Winterberg (DE)

( * ) Notice: Subject to any disclaimer, the term of this patent is extended or adjusted under 35 U.S.C. 154(b) by 0 days.

(21) Appl. No.: 14/119,024

(22) PCT Filed: May 21, 2012

(86) PCT No.: PCT/DE2012/000516
§ 371 (c)(1),
(2), (4) Date: Nov. 20, 2013

(87) PCT Pub. No.: WO2012/159603
PCT Pub. Date: Nov. 29, 2012

(65) Prior Publication Data
US 2014/0125089 A1 May 8, 2014

(30) Foreign Application Priority Data
May 25, 2011 (DE) .......................... 20 2011 104 492

(51) Int. Cl.
*B60N 99/00* (2006.01)
*B62D 21/15* (2006.01)

(52) U.S. Cl.
CPC .................................. *B62D 21/157* (2013.01)

(58) Field of Classification Search
CPC ............................ B62D 25/025; B62D 21/157
USPC ........................................................ 296/209
See application file for complete search history.

(56) References Cited

U.S. PATENT DOCUMENTS

| | | | | |
|---|---|---|---|---|
| 4,911,495 A | * | 3/1990 | Haga et al. ..................... | 296/209 |
| 5,443,297 A | * | 8/1995 | Tanaka et al. ............ | 296/203.03 |
| 6,357,822 B1 | | 3/2002 | Panoz | |
| 8,308,227 B2 | | 11/2012 | Tsuruta et al. | |

FOREIGN PATENT DOCUMENTS

| | | |
|---|---|---|
| DE | 19538844 A1 | 4/1997 |
| DE | 19633911 A1 | 2/1998 |
| DE | 10031901 A1 | 1/2002 |
| EP | 0618128 A1 | 10/1994 |
| KR | 100302741 B1 | 7/2001 |
| WO | 2011/144613 A1 | 11/2011 |

OTHER PUBLICATIONS

International Search Report; PCT/DE2012/000516; International Filing Date: May 21, 2012; Joachim Rachfahl; 3 pgs.

* cited by examiner

*Primary Examiner* — Lori L Lyjak
(74) *Attorney, Agent, or Firm* — Schmeiser, Olsen & Watts, LLP

(57) ABSTRACT

A safety sill for a vehicle body, which is characterized by at least two molded parts that are connected to one another in a form-closed manner and form a body member, wherein the first load-bearing molded part is a support element having an inside and an outside and the second load-bearing molded part is a sill element, the outside of the support element faces the sill element and either the support element or the sill element can be mounted to the body-in-white and the other load-bearing molded part can be mounted to the molded part mounted to the body-in-white, is provided.

17 Claims, 3 Drawing Sheets

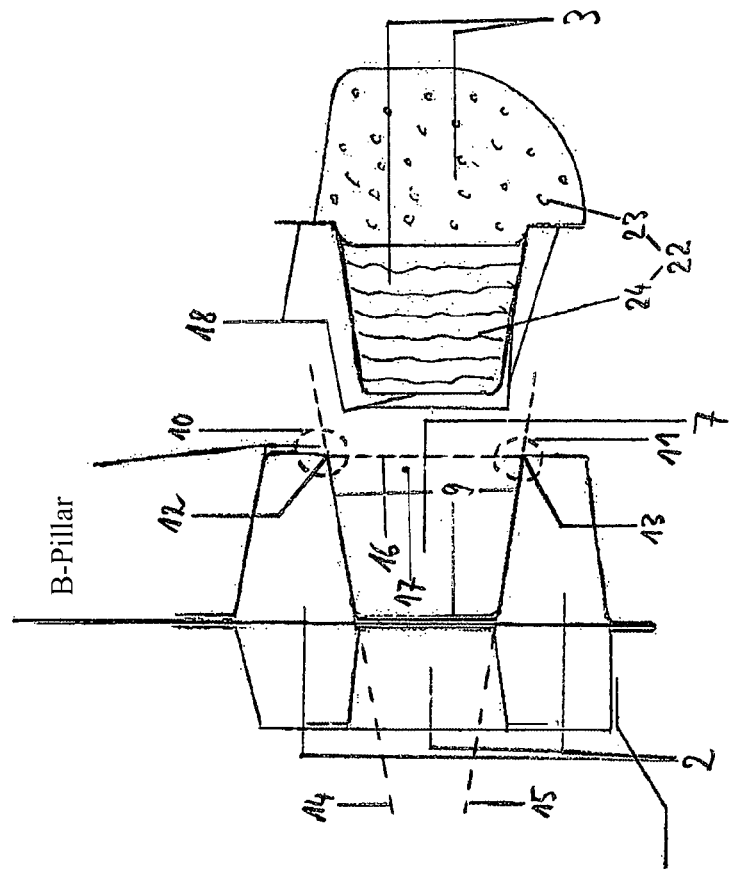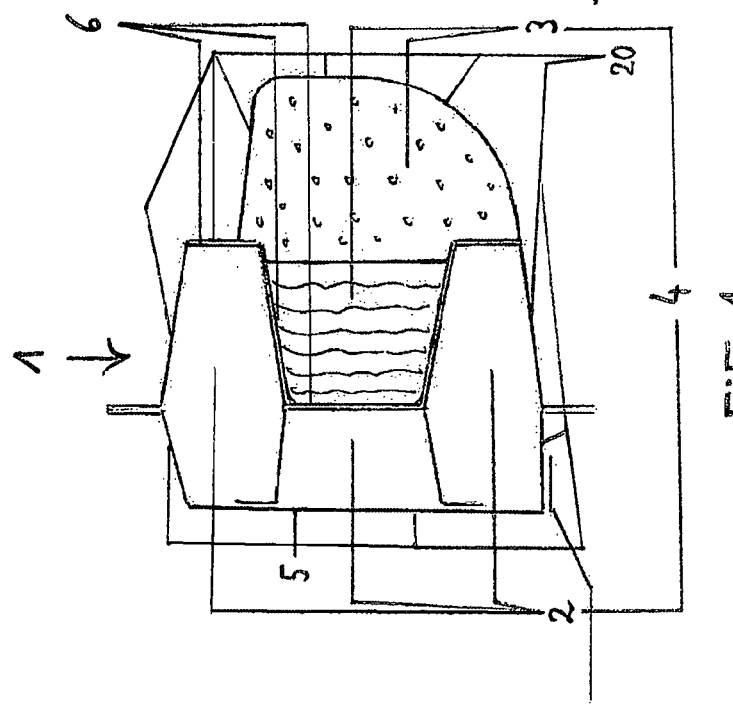

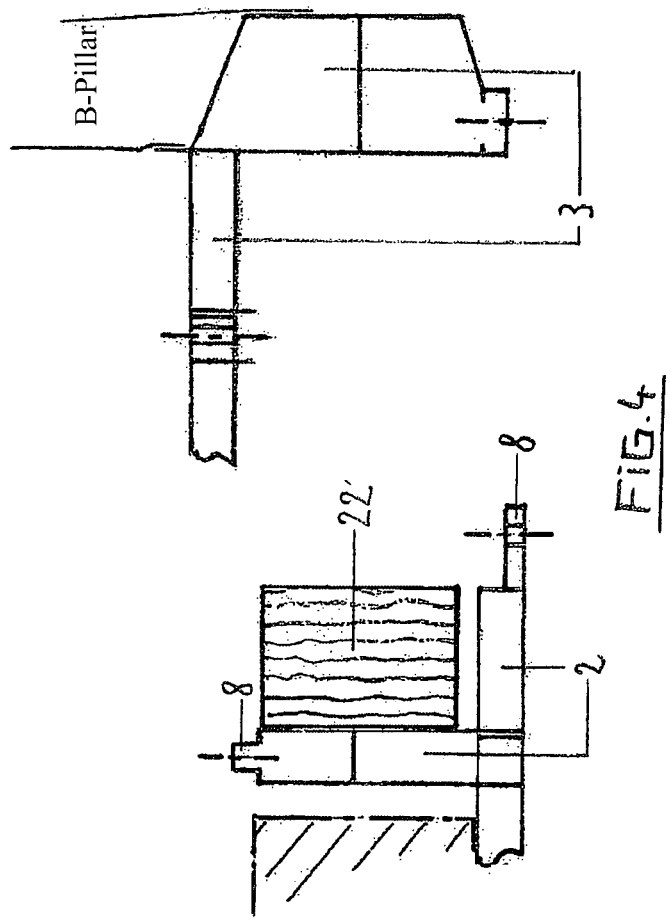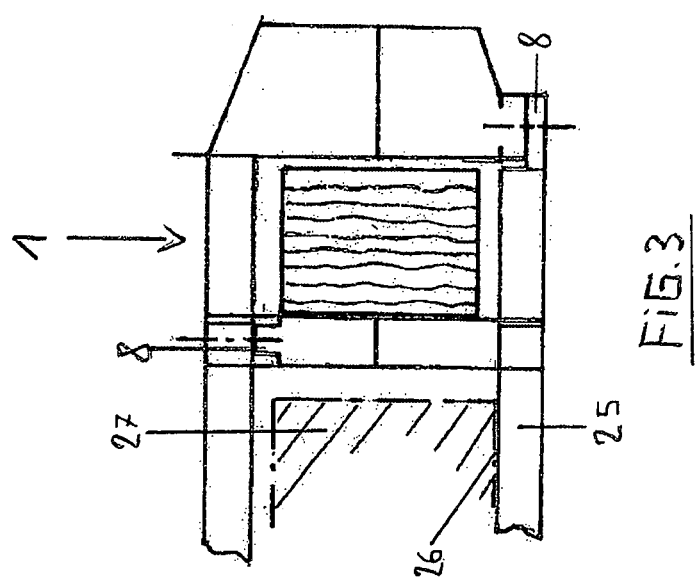

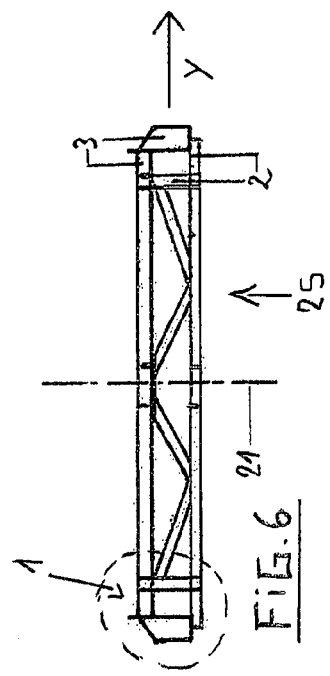
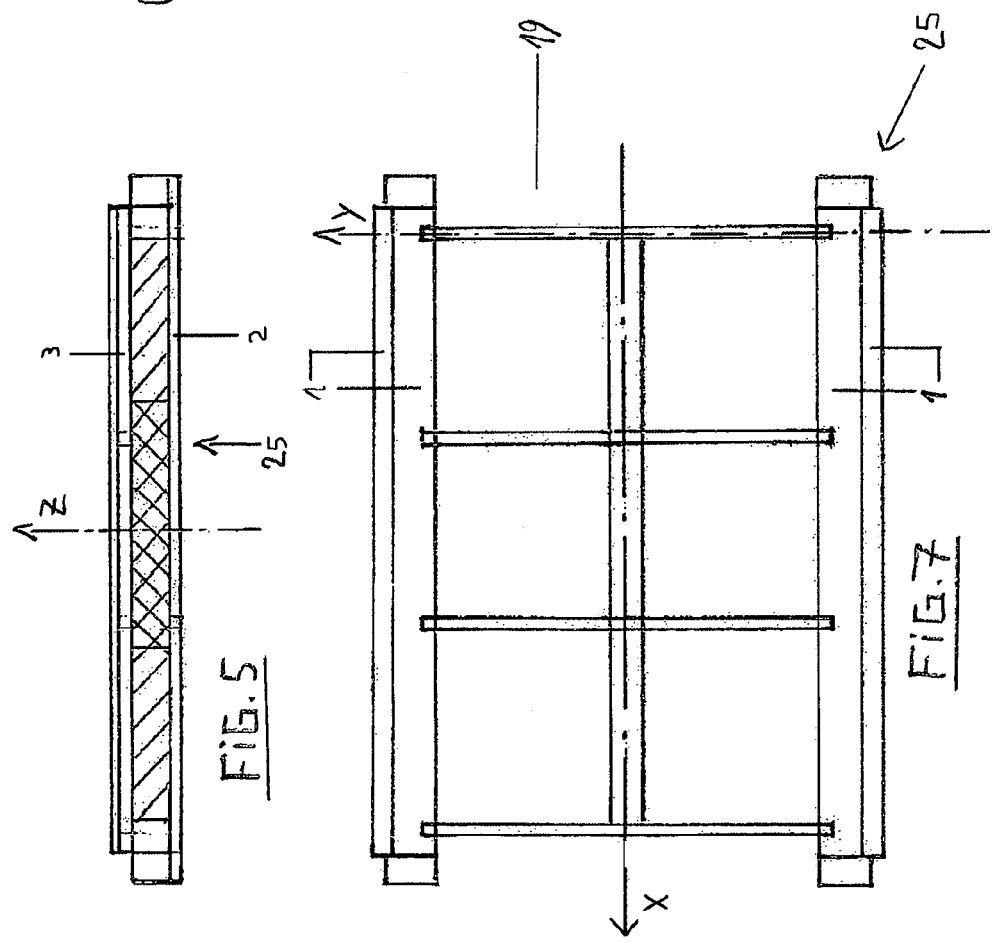

SAFETY SILL FOR A STRUCTURAL FRAME BEARING A BATTERY IN THE EVENT OF A SIDE IMPACT

CROSS-REFERENCE TO RELATED APPLICATIONS

This application claims priority to PCT Application No. PCT/DE2012/000516, having a filing date of May 21, 2012, pursuant to U.S.C. §365.

FIELD OF TECHNOLOGY

The following relates to a safety sill for a structural frame, and more specifically to a safety sill for a vehicle body.

BACKGROUND

In motor vehicle body construction it has always been desirable to save weight. However, any reduction in weight must not be achieved at the expense of body characteristics in terms of stability, desired rigidity and, last but not least, mountability in the context of robot-supported production lines. In particular those body regions which because of their stability characteristics in the case of accidents are to absorb the forces that are typically encountered in accidents are the subject of numerous different design efforts. Especially sills and structural members of vehicle bodies have been varied many times.

The principal significance of the sill as a vehicle body element consists of absorbing loads both during head-on crashes and during lateral impact collisions. In lateral impact collisions balanced stiffness is desired that makes possible a targeted reduction of the impact energy. Thus, multi-component sills with a closed profile are often designed with ribs, stiffening elements or generally load transmission elements in their interior in order to, in particular, locally improve buckling resistance, as has been disclosed, for example, in DE 11 2008 002 515 T5. During manufacture the sill geometry is thus of significance inasmuch as it determines the manner, especially the particular direction, and the particular production step during which insertion of load transmission elements is to take place.

The above is associated with disadvantages in that, as a result of the focus on the static and dynamic requirements, the forms of load transmission elements and the surrounding deformation contour of the sill are as a rule designed so that the deformation contour of the sill needs to be closed before the usual coating by means of cathodic immersion paint coating can take place. Any insertion of load transmission elements after immersion paint coating is not possible without incurring undesirable disadvantages in the overall production process. As a result of this the choice of materials for the load transmission elements is limited. Generally speaking the sill is joined to or beside a support element mounted to the body-in-white. Both molded parts significantly contribute to the weight and the material used in vehicle body construction.

SUMMARY

The present application achieves a reduction in weight while at the same time achieving savings in the use of materials, to expand the options in the selection of materials, to make possible the use of a mixture of materials, for example steel and aluminium, in other words a hybrid construction, to overcome the disadvantages stated, and to improve the interaction between support elements and sills.

According to the invention, this is met by means of a safety sill according to claim 1, wherein advantageous embodiments of the invention are stated in the subordinate claims.

A safety sill is proposed that on the one hand meets the classical function of a sill, in other words in a targeted manner absorbs loads during head-on crash events or lateral crash events, and on the other hand carries out the function of a support element mounted to the body-in-white in the overall structure of a vehicle body, preferably as a longitudinal support of a mounting frame for a vehicle body. The two functions are combined in that a molded part of the structural member of the vehicle body, which molded part has already been mounted to the body-in-white, which molded part need not itself provide adequate load capacity and strength, is joined, as a support element together with the remaining body-in-white, preferably after the anti-corrosion treatment by means of cathodic immersion paint coating, to a sill element. In this design the sill element on the one hand increases the load capacity and strength of the support element mounted to the body-in-white to an extent that is adequate for a body member, thus, together with the support element forming an at least two-part structural member of the vehicle body which on the other hand comprises characteristics for the absorption of impact loads that are required from a safety sill. In this design the share of the support element in proportion to the share of the sill element on the body member or on the safety sill can be adapted to match the corresponding requirements. It is not mandatory for the support element to be installed to the body-in-white. It is also possible for the sill element to be provided on the body-in-white and for said sill element to be jointed to a support element, which, for example, forms part of a mounting frame.

This design is based on the three-dimensional right-hand ENU (East-North-Up) coordinate system that is common in vehicle construction, with the zero point of said coordinate system being situated in the middle of an imaginary line between the centres of both front wheels. The Y-axis extends along this line from the right-hand to the left-hand vehicle side, the X-axis extends from the rear to the front, and the Z-axis extends from the floor to the roof. It is advantageous if the geometry of the support element makes it possible to join the sill element laterally in a form-closed manner, in other words essentially without displacement in the direction of the X-axis or the Z-axis of the vehicle body. This can be achieved in a simple embodiment when the cross section of the support element is L-shaped and within the body-in-white is arranged in such a manner that the lateral limb of the L along the Y-axis does not point to the middle of the vehicle body but instead to the outside. If the sill element also has an L-shaped cross section which in terms of its size matches the support element, the sill element can advantageously supplement the support element to form a closed rectangular body member or safety sill. In this variant it is possible to provide embodiments with various load absorption elements that match the corresponding requirements in terms of the characteristics of absorbing impact energy, for example as a honeycomb structure, with these embodiments being enclosed by the closed-cross-section deformation contour formed by the support element and the sill element, which embodiments otherwise are not however subject to any limitations in terms of their type and structure by the process of cathodic immersion paint coating or some other suitable type of coating.

Another variant of the safety sill comprises a support element with a cavity on the outside, into which cavity the sill element can be laterally inserted in a form-closed manner, essentially along the Y-axis. In the advantageous simplest case, in this design the support element has the shape of the letter U on its side, with the opening of the U pointing outwards and forming the cavity for the sill element. In terms of providing lateral access to the cavity it is advantageous if the cross section is laterally open to such an extent that the tangents of the points of the contour drawn as a single line, which points are situated on the extreme outside, intersect on the inside or extend parallel to one another. In this context the term "tangent" not only refers to the incline in a point of a curved line, but also in a point of a straight line. In practical application this means that no protrusions of the contour project into the opening, which protrusions would require avoidance movement along the Z-axis or X-axis during insertion that takes place along the Y-axis. Insertion along the Y-axis is desirable in order to ensure integration without complications in the feed-in of the sill elements in production lines according to the state of the art.

In order to fix a sill element inserted against or into the support element after the customary immersion paint coating, it is advantageous to use a fastening technique that does not require the use of warmth or heat as would be the case in welding techniques. It is thus preferred to interconnect the support element and the sill element by means of adhesive bonding or screwing. In particular in the case of fixing by bonding it is advantageous if all the contact surfaces of the form-lock between the two molded parts are inclined relative to the X-Y-plane of the vehicle body, because frictional engagement on contact surfaces extending parallel to the X-Y-plane, even reinforced by adhesive bonding, in the case of lateral impact loads is considerably less than in the case of correspondingly inclined surfaces.

Embodiments that withstand increased impact loads result when the deformation contour comprising the support element and the sill element, in other words the outer jacket surface of both elements in the joined state, is enlarged by one or several crash-protection molded parts that are preferably joined to the outside of the sill element. Of course, it is not mandatory to use additional molded parts. It is also possible to contour the sill element so that after it has been joined to the support element it does not only entirely or partly fill the cavity of the support element, but also outside this cavity comprises a shape which in its function and dimensions corresponds to an additional crash-protection molded part. The multi-unit design with a crash-protection molded part provides an advantage in that prefabricated molded parts comprising different materials can be used that optionally include a load transmission element, specific to each application, which can be optimally matched to the demands relating to the molded part in its respective position. A mixture of materials relating to the safety sill is possible independently of an additional crash-protection molded part, for example if the support element is made from steel and the sill element is made from aluminium. Likewise, it is possible to provide a combination of different structures and materials for a combined load transmission element within a closed cross section, for example that of the sill element or that of the safety sill comprising the L-shaped support element and the sill element.

Moreover, a multitude of materials relating to the load transmission elements are now worth considering, for example composite materials, aluminium foam as a cavity filler, ribs or the like, honeycomb structures or any combination of these. Because of the production-technology options that become available by joining a support element with a sill element to form a safety sill, it is now possible to use materials for the load transmission elements, which materials could previously not be used because of the physical conditions during the hitherto necessary painting step taking place after the installation of load transmission elements. If desired, the mountable sill element can of course subsequently be provided with a suitable paint coat, or the externally visible part of the deformation contour can be covered by a design panel that has the desired visual characteristics.

A preferred embodiment of the safety sill for electric vehicles results when the mountable support element forms part of a, conveniently, closed mounting frame for the vehicle body, which mounting frame comprises a receptacle for a battery pack. Advantageously in this variant the L-shape of the support element is used, supplemented by a complementary L-shaped sill element. In this variant the joining of the support element and the sill element can, at least in some regions, also take place along the Z-axis.

BRIEF DESCRIPTION

FIG. 1 depicts a cross sectional view of an embodiment of a safety sill that has been joined, by adhesive bonding, from a support element mounted to the body-in-white and a mountable sill element;

FIG. 2 depicts a cross-sectional view of an embodiment of the sill element as a single-part exemplary embodiment with an advantageous shape;

FIG. 3 depicts a cross-sectional view of an embodiment of the safety sill for electric vehicles;

FIG. 4 depicts a cross-sectional view of an embodiment of the support element and the sill element prior to installation of the exemplary embodiment of FIG. 3;

FIG. 5 depicts a cross-sectional view of an embodiment of the mounting frame with the support element and the sill element from the side along the X-Z-plane for the exemplary embodiment of FIG. 3;

FIG. 6 depicts a cross-sectional view of an embodiment of the mounting frame for the exemplary embodiment of FIG. 3 from the front along the Y-Z-plane; and FIG. 7 depicts an embodiment of the mounting frame with two safety sills for the exemplary embodiment of FIG. 3 from above onto the X-Y-plane.

DETAILED DESCRIPTION

Below, preferred embodiments of the safety sill are explained in more detail with reference to the drawings.

FIG. 1 shows a cross section of a safety sill (1) that has been joined, by adhesive bonding, from a support element (2) mounted to the body-in-white and a mountable sill element (3). The diagram shows the inside (5) and the outside (6) of the support element (2), wherein the outside (6) in this exemplary embodiment comprises an almost U-shaped cavity (see FIG. 2, cipher 7). By joining the support element (2) with the sill element (3) a body member (4) is constituted that conforms with the safety sill (1), wherein the structural characteristics in this example predominantly result from the support element (2) and the part of the sill element (3), which part fills the cavity (see FIG. 2, cipher 7). The outer jacket surface of the safety sill forms the deformation contour (20), which can also be covered by means of a design panel that can optionally be affixed.

FIG. 2 shows the support element (2) with the B-pillar in position in cross section and the matching sill element (3) in cross section. The diagram shows the open contour line (9) of the outside (6) along the cavity (7), which in this position is almost U-shaped, the ends (10, 11) of the contour line (9), the points (12, 13) of the contour line (9), which points are situated on the extreme outside, and the tangents (14, 15) in these points (12, 13) which as a result of the shape of the cavity (7)

in terms of the connecting line (16) intersect between the points (12, 13) on the side (17) of the support element (2).

Furthermore, FIG. 2 shows the sill element (3) in cross section as a single-part exemplary embodiment with an advantageous shape. It is possible to distinguish two regions of the sill element (3) because of the combined design of the load transmission element (22), on the one hand as a result of the honeycomb structure (24), shown as an example, in the part of the sill element (3), which part fills the cavity (7) of the support element (2), and on the other hand because of the aluminium foam (23), which as an example is integrated, in the region arranged further to the outside. Furthermore, the contact surfaces (18) for the form-lock between the support element (2) and the sill element (3) are shown, which contact surfaces (18) in the diagram are advantageously all inclined relative to the X-Y plane of the vehicle body, thus providing good frictional engagement in the case of impact loads.

FIG. 3 shows a further exemplary embodiment of the safety sill (1) in cross section, which embodiment is suitable, in particular, for electric vehicles due to the L-shape of the sill element (3) on the side of the body-in-white and the complementary L-shape of the support element (2), wherein the support element (2) is connected to the sill element (3) by way of connecting extensions (8), in the diagram shown by means of screw connections indicated by broken lines. Furthermore, in this diagram part of the mounting frame (25) with a receptacle (26) for a battery pack (27) for an electric vehicle is shown.

FIG. 4 shows the support element (2) and the sill element (3) in cross section prior to installation of the exemplary embodiment of FIG. 3. The diagram clearly shows that a load transmission element (22) can be inserted with easy access between the support element (2) and the sill element (3). Here again, on the sill element (3) the B-pillar is indicated in its position in the overall body structure.

FIG. 5 shows the mounting frame (25) with the support element (2) and the sill element (3) from the side in cross section along the X-Z-plane for the exemplary embodiment of FIG. 3.

FIG. 6 shows the mounting frame (25) for the exemplary embodiment of FIG. 3 from the front in cross section along the Y-Z-plane and the safety sill (1) or the support element (2) and the sill element (3) in relation to the middle (21) of the vehicle body in terms of the Y-axis.

FIG. 7 shows the mounting frame (25) with two safety sills (1) for the exemplary embodiment of FIG. 3 from above onto the X-Y-plane (19), wherein the safety sills (1) form the rungs of a double ladder-type frame.

The invention claimed is:

1. A safety sill for a vehicle body, comprising:
   at least two molded parts that are connected to one another in a form-closed manner to form a body member and achieve a joined state,
   wherein the at least two molded parts include a first load-bearing molded part and a second molded part, the first load-bearing molded part being a support element having an inside and an outside, and the second load-bearing molded part being a sill element, further wherein the sill element is inserted at least one of into and against the support element to achieve the joined state;
   wherein the outside of the support element faces the sill element, and either the support element or the sill element is mounted to a body-in-white, and the other load-bearing molded part is mounted to the molded part mounted to the body-in-white;
   wherein the support element comprises at least one of an L-shaped and U-shaped cross section that at least on the outside is open.

2. The safety sill according to claim 1, wherein the support element includes at least one of a cavity and a connecting extension on the outside of the support element for a laterally achieved form lock with the sill element.

3. The safety sill according to claim 2, wherein the outside along the cavity in cross section of the support element represents an open contour line with two ends, wherein the tangents through the respective points of these ends, which points are situated on an extreme outside of these ends, intersect in terms of a connecting line through these two points on the side of the support element or extend so as to be essentially parallel to one another.

4. The safety sill according to claim 1, wherein
the support element and the sill element are interconnected by a means of cold fastening technology.

5. The safety sill according to claim 1, wherein
all the contact surfaces of a form-lock between the support element and the sill element are inclined relative to the X-Y-plane of the vehicle body.

6. The safety sill according to claim 1, wherein
a deformation contour that is closed in cross section.

7. The safety sill according to claim 6, wherein
the deformation contour comprises the support element and the sill element.

8. The safety sill according to claim 6, wherein
the deformation contour comprises at least the support element and at least a crash-protection molded part that differs from the support element and the sill element, wherein the support element is arranged between the crash-protection molded part and the middle of the vehicle body in terms of the Y-axis.

9. The safety sill according to claim 6, wherein
the deformation contour encloses at least one load transmission element.

10. The safety sill according to claim 1, wherein
the support element and the sill element comprise different materials.

11. The safety sill according to claim 8, wherein
a load transmission element comprises a composite material, a cavity filler, a rib or the like, a honeycomb structure or any combination of these.

12. The safety sill according to claim 1, wherein
the support element and the sill element comprise different coatings.

13. The safety sill according to claim 1, wherein
a design panel covers the deformation contour at least in part.

14. The safety sill according to claim 1, wherein
the support element forms part of a mounting frame for the vehicle body.

15. The safety sill according to claim 14, wherein
the mounting frame comprises at least one receptacle for a battery pack of an electric vehicle.

16. The safety sill according to claim 4, wherein the means of cold fastening technology is screwing or adhesive bonding.

17. The safety sill according to claim 11, wherein the cavity filler is an aluminium foam.

* * * * *